(No Model.)
M. DE WITT.
FACE STEAMING APPLIANCE.
No. 517,846. Patented Apr. 10, 1894.
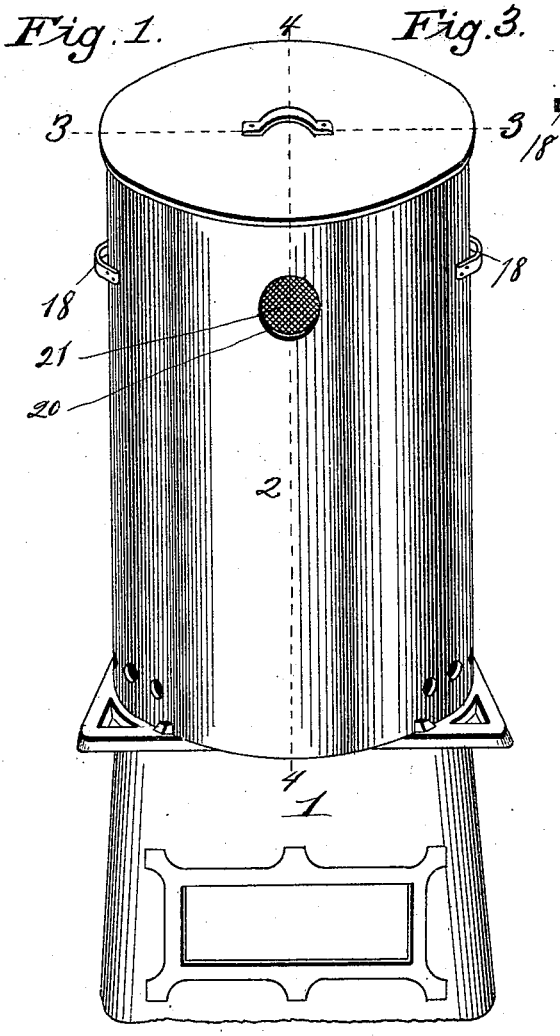
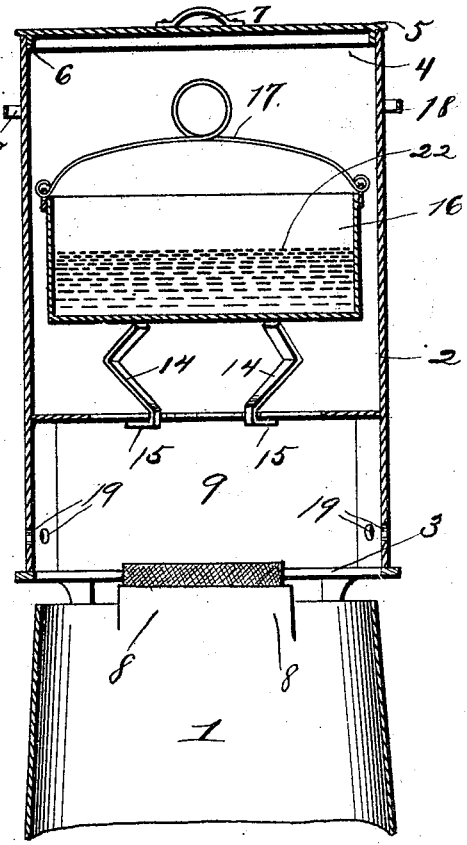
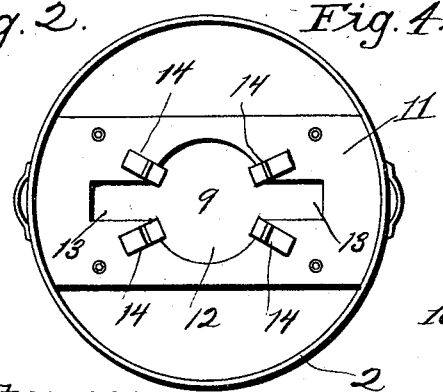
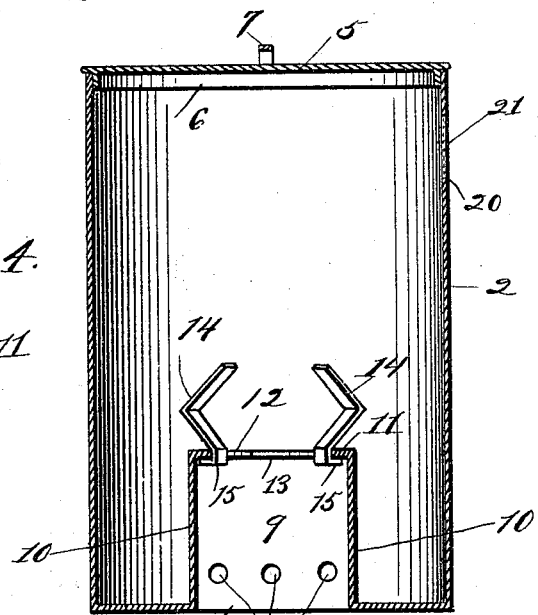
Witnesses:
F. G. Fischer
G. W. Thorpe
Inventor:
Margaret De Witt
By Higdon & Higdon
Attys.

UNITED STATES PATENT OFFICE.

MARGARET DE WITT, OF KANSAS CITY, MISSOURI.

FACE-STEAMING APPLIANCE.

SPECIFICATION forming part of Letters Patent No. 517,846, dated April 10, 1894.

Application filed April 14, 1893. Serial No. 470,285. (No model.)

*To all whom it may concern:*

Be it known that I, MARGARET DE WITT, of Kansas City, Jackson county, Missouri, have invented certain new and useful Improvements in Face-Steaming Appliances, of which the following is a full, clear, and exact description, reference being had to the accompanying drawings, forming a part hereof.

My invention relates to improvements in face steaming appliances; and the object of my invention is to produce a face steamer, which is simple, strong, durable and inexpensive of construction, which is of ornamental appearance, and which can be placed upon an oil-stove or other suitable stove or burner.

To the above purposes, my invention consists in certain peculiar and novel features of construction and arrangement, as will be hereinafter fully described and claimed.

In order that my invention may be fully understood, I will proceed to describe it with reference to the accompanying drawings, in which—

Figure 1, represents a perspective view of a face steamer, constructed in accordance with my invention. Fig. 2, is a plan view of the face steamer with the cover and water-vessel removed. Fig. 3, is a vertical central sectional view taken on the line 3—3 of Fig. 1. Fig. 4, is a vertical central sectional view, taken on the line 4—4 of Fig. 1.

Referring to the drawings, 1 designates an oil or other suitable stove. My face steaming appliance, is of cylindrical form preferably and rests upon the top of the stove as shown. The cylindrical casing 2 of the steaming appliance is formed with an opening 3 in its bottom, and is also formed with an open upper end 4, and a cap or cover 5 provided with a depending circular flange 6 which is adapted to fit within the upper end of the casing 2 of the steaming appliance, rests upon and closes the upper end of said casing. This cover is also provided with a handle 7 by which it may be removed when desired. The opening 3 in the bottom of the casing is preferably arranged to inclose the burner 8 of the oil stove, as shown in Fig. 3, so that the heat and flames from the burner, shall pass upward into the compartment 9, formed by the vertical and parallel walls 10 which extend upwardly from the side margins of the said opening for a suitable distance, and from side to side of the casing 2. The upper end of this compartment 9 is formed by means of a horizontal partition 11 which is secured thereon in any suitable manner, and said partition is provided with a central vertical opening 12 and at each side of said opening with the longitudinally aligned notches 13; these notches being provided, so that when a straight wick burner is used, the heat from the flame may pass directly through said openings or recesses. Secured to the under side of said partition or cover 11 is a number of upwardly extending and approximately Z-shaped (in edge view) supporting arms 14, the lower horizontal portions 15 of which, are secured to the under side of the partition or plate 11 in any suitable manner, and upon the upper or free ends of said supporting arms is supported a horizontal cup or pan 16 which is of diameter to fit within the casing 2. This cup or pan is also provided with a wire-handle or other suitable handle 17 by which it may be moved when required. The outer side of the casing near its upper end is also provided with handles 18 by which it may be grasped to remove it from or place it upon the stove or in any other position desired. The casing 2 is further formed at its lower end and in its opposite sides with a number of air-inlet openings 19 which connect with the interior of the compartment 9, so as to admit air to support perfect combustion within said compartment, and the casing is further provided at its upper end with an opening 20 across which is stretched and secured in any suitable manner a wire-cloth 21, as shown in Figs. 1 and 4.

In operation, the appliance being in the position shown upon a stove and the cap or basin 16 being partially filled with water as shown at 22, the oil stove is lighted so that the heat therefrom and the products of combustion will pass up through the openings 12 and 13 and impinge upon and envelop the bottom of said water cup or basin. When sufficient steam has been generated thus, a cloth of any suitable material is thrown over and entirely envelops the appliance and is also placed over the head in such manner that the face is adjacent to the opening 20, and the steam passing through the meshes of the wire cloth 21 and opening 20, thoroughly steams the face, thereby softening and beautifying the skin, and by thus softening the skin allows of the removal of black heads, pimples, &c. When the face has been sufficiently steamed, the cover is removed from the head and the fire from the stove extinguished. It will thus be seen that I have produced a face steaming appliance inexpensive of construction, and ornamental of appearance.

Having thus described my invention, what I claim as new, and desire to secure by Letters Patent, is—

In a face steaming appliance, the combination with a casing, a horizontal partition dividing the casing into an upper and a lower compartment, and provided with a central aperture, air-inlet openings communicating with the lower compartment, and a steam outlet opening communicating with the upper compartment, of a water receptacle in the upper compartment, and legs, secured at their lower ends to the margin of the opening of the horizontal partition, and supporting said water receptacle, substantially as set forth.

In testimony whereof I affix my signature in the presence of two witnesses.

MARGARET DE WITT.

Witnesses:
G. Y. THORPE,
M. P. SMITH.